United States Patent [19]

Arbir et al.

[11] 4,419,461

[45] Dec. 6, 1983

[54] CATALYST FOR MAKING POLYURETHANES

[75] Inventors: Francis W. Arbir, Itasca; Daniel S. Raden, Hawthorn Woods; Kenneth W. Narducy, Bloomingdale; Francois M. Casati, Highland Park, all of Ill.

[73] Assignee: Abbott Laboratories, North Chicago, Ill.

[21] Appl. No.: 435,842

[22] Filed: Oct. 21, 1982

Related U.S. Application Data

[62] Division of Ser. No. 252,634, Apr. 9, 1981.

[51] Int. Cl.$^3$ ............................................. C08G 18/14
[52] U.S. Cl. .................................. 521/126; 521/127; 521/129; 521/157; 521/163; 528/49; 528/71

[58] Field of Search ............... 521/126, 127, 129, 157, 521/163; 528/49, 71

[56] References Cited

U.S. PATENT DOCUMENTS 4,040,992 8/1977 Bechara et al. ..................... 528/49
4,212,952 7/1980 Murphy et al. ..................... 521/112

*Primary Examiner*—Maurice J. Welsh
*Attorney, Agent, or Firm*—Dennis K. Shelton; Martin L. Katz

[57] ABSTRACT

Polyurethane foams with excellent physical properties can be obtained by using a partial salt between N,N-dimethylaminopropane-1,3-diamine (DMAPA) and a branched octanoic acid.

6 Claims, No Drawings

CATALYST FOR MAKING POLYURETHANES

This application is a division, of application Ser. No. 252,634, filed Apr. 9, 1981.

DETAILED DESCRIPTION OF THE INVENTION

Polyurethanes are widely used where rigid, semi-rigid or flexible foams are needed. Particularly, in formulations leading to flexible products and to some extent in the others, blowing agents are used to provide a cellular structure. While water can be used as the only blowing agent, most polyurethane foams are made by using fluorinated hydrocarbons such as those known as Freon ® compounds. However, because of environmental considerations, fluorinated hydrocarbons are in current disfavor and may some day have to be replaced entirely in formulations used on large scale such as urethane manufacture.

Unfortunately, the replacement of the fluorocarbons by other materials requires much more than just a substitution thereof by other halogenated hydrocarbons; in fact, many foam formulations where the Freon has been substituted, for example, by methylene chloride, do not lead to usable polyurethanes. Methylene chloride would otherwise fit all of the needs of a blowing agent, having the right vapor pressure and other physical characteristics.

Because methylene chloride cannot simply be substituted for a Freon, other adjustments need to be made in the urethane formulations. Obviously, it is not desirable to change the polyols or the polyisocyanates that have been manufactured in large scale in the past. The simplest adjustment therefore lies in the selection of a catalyst for the urethane reaction.

Amine catalysts of all types have been used for many years in the urethane foam industry: primary amines, secondary amines, di- or tri-tertiary amines, combination or primary and tertiary amines, etc. with or without tin co-catalysts and any variation of mixtures of the above. A great many of these catalysts or mixtures thereof simply do not produce a useful urethane foam when methylene chloride is present.

It has now been discovered that a partial salt between 3-dimethylaminopropylamine (hereinafter referred to as DMAPA) and a branched octanoic acid produces excellent foams. The term "partial salt" must, for the purpose of this description, be interpreted as meaning a combination of 10 equivalents of DMAPA with 1 to 5 equivalents of a branched octanoic acid, and by no means is intended to identify the named combination as a true salt. Branched octanoic acid, for the purpose of this description, is intended to define a linear carbon chain of 7 carbons carrying the carboxylic acid group in a position other than the 1- or 7-positions; for instance, dipropylacetic acid, 2-ethylhexanoic acid, 2-methylheptanoic acid, with the 2-ethylhexanoic acid being the preferred.

As mentioned before, the "salt" terminology would apply only to part of the new mixture since only 10 to 50 percent of the nitrogen functions of DMAPA are blocked by the branched octanoic acid. The two reactants are therefore just simply mixed in the desired proportion for use as a urethane catalyst, requiring no other manipulations than the physical combining of the appropriate portions thereof. This mixture can then be used in the formulation leading to polyurethane foams and is particularly effective, when methylene chloride is used as part of the blowing agent component. However, this invention is not limited to the use of the above partial salt between DMAPA and a branched octanoic acid in methylene chloride blown foams; it can also be used in some Freon blown foams, particularly in connection with tin or other amine co-catalysts. The new DMAPA/DMAPA-salt mixture, however, is of greatest use where methylene chloride is used in conjunction with water and/or other blowing agents, and, particularly in the presence of the commonly used diluent dipropylene glycol (DPG).

To show the effect of the new catalyst, reference is made to the following examples, which, however, are for illustration only and are not intended to limit this invention in any respect. All parts and percentages used are based on weight unless specified differently; all catalyst percentages are based on the amount of polyol used.

EXAMPLE 1

After mixing 100 parts of a polyoxyethylenepolyoxy-propylene triol (marketed as Voranol ® 3010 by Dow Chemical), 3.5 parts of water, 12.0 parts of methylene chloride, 1.2 parts of a silicone surfactant (sold as Tegostab ® BF-2370 by Th. Goldschmidt AG), the shown amount of stannous octoate used as a 50% solution in dioctyl phthalate (DOP) and the specified amount of the partially blocked DMAPA salt, the appropriate amount (110% of theoretically calculated stoichiometry, or 110 index) of a toluene di-isocyanate (sold as Mondur ® TD-80 by Mobay Chemical) is added and stirred at 3,000 rpm for 8 seconds with a 3-inch Conn mixer. The stirred mixture is poured into a corrugated cardboard box, 17×17×15 inches, and allowed to rise, producing the results indicated below in Table I, using 2-ethylhexanoic acid for blocking:

TABLE I

| Amine type | | Mixture (A) | | | | | DMAPA + 25% EHA | | | DMAPA + 50% EHA | | |
|---|---|---|---|---|---|---|---|---|---|---|---|---|
| Amine level | % | 0.2 | 0.3 | 0.2 | 0.2 | 0.2 | 0.15 | 0.15 | 0.1 | 0.1 | 0.15 | 0.2 |
| DPG | % | 0 | 0 | 0 | 0 | 0 | — | 0.15 | 0.1 | 0.1 | 0.15 | 0.2 |
| Tin octoate/DOP | % | 0.6 | 0.7 | 0.8 | 1.0 | 1.2 | 0.7 | 0.7 | 0.7 | 0.7 | 0.7 | 0.7 |
| Cream time | Sec | 18 | 13 | 17 | 15 | 15 | 15 | 16 | 17 | 16 | 13 | 12 |
| Rise time | Sec | (B) | (C) | (B) | 115 | 106 | 135 | 142 | 137 | 135 | 130 | 130 |
| Gel time | Sec | — | — | — | 155 | 141 | 160 | 167 | 162 | 155 | 150 | 150 |
| Density | pcf | — | — | — | 1.16 | 1.16 | 1.28 | 1.33 | 1.24 | 1.21 | 1.23 | 1.24 |
| Air flow | scfm | — | — | — | 7.43 | 3.83 | 5.0 | 5.6 | 5.5 | 4.7 | 5.5 | 5.5 |
| Compr. set 50% | % | — | — | — | — | — | 6.58 | 6.93 | 3.87 | 5.08 | 5.04 | 4.88 |
| Compr set 90% | % | — | — | — | — | — | 22.07 | 7.93 | 4.84 | 5.63 | 5.33 | 5.32 |

(A) 33% triethylenediamine in DPG + equal parts of N—methyldicyclohexylamine (this mixture thus contains 33.3% DPG)
(B) Collapsed
(C) Split The above table demonstrates that using 0.2% or more of a standard catalyst does not produce a foam;

unless at least 0.5% of stannous octoate is used; on the other hand, perfectly good foams are obtained when using DMAPA blocked by 25 and 50%, respectively, of 2-ethylhexanoic acid starting with 0.1% catalyst and 0.7% stannous octoate.

EXAMPLE 2

In order to show the use of the above new catalyst in conjunction with other amine catalysts, DMAPA is used with 25% 2-EHA blockage. The formulation shown in Example 1 is used; the co-catalyst is [Me$_2$N(CH$_2$)$_3$]$_2$N-Me. As shown in Table II, good foams are obtained, particularly at lower tin catalyst levels.

TABLE II

| Catalyst level | % | 0.15 | 0.15 | 0.15 | 0.125 | 0.125 | 0.125 | 0.125 |
|---|---|---|---|---|---|---|---|---|
| DPG | % | 0.15 | 0.15 | 0.15 | 0.125 | 0.125 | 0.125 | 0.125 |
| Co-Catalyst level | % | — | — | — | 0.05 | 0.05 | 0.05 | 0.05 |
| Sn(Oct)$_2$ level | % | 0.6 | 0.7 | 0.8 | 0.6 | 0.7 | 0.8 | 1.0 |
| Cream time | Sec | 17 | 17 | 15 | 15 | 14 | 13 | 12 |
| Rise time | Sec | 150 | 140 | 125 | 140 | 130 | 116 | 102 |
| Gel time | Sec | 175 | 160 | 145 | 165 | 150 | 136 | 117 |
| Density | pcf | 1.29 | 1.24 | 1.23 | 1.24 | 1.21 | 1.29 | 1.18 |
| Airflow | scfm | 4.5 | 4.0 | 1.1 | 6.8 | 5.6 | 2.3 | 0.27 |
| 50% Compr set | % | 6.8 | 7.7 | (D) | 6.7 | 6.4 | 7.9 | (D) |

(D) flattened out; collapsed

EXAMPLE 3

In order to show the activity of the above catalyst in a low density foam, the formulation of Example 1 was changed by increasing the methylene chloride level to 18% and that of the surfactant to 1.8%. The same catalyst and tin co-catalyst was used as in Example 2 at levels indicated below. The DMAPA/2-EHA mixture again was used as a 50% solution in DPG, the combined amount being given.

TABLE III

| Catalyst level | % | 0.40 | 0.50 | 0.33 | 0.42 |
|---|---|---|---|---|---|
| Co-Catalyst level | % | — | — | 0.07 | 0.08 |
| Sn(Oct)$_2$ level | % | 0.8 | 0.8 | 0.8 | 0.8 |
| Cream time | Sec | 14 | 14 | 13 | 11 |
| Rise time | Sec | 150 | 135 | 132 | 125 |
| Gel time | Sec | 170 | 155 | 152 | 145 |
| Density | pcf | 1.09 | 1.10 | 1.08 | 1.08 |
| Air flow | Scfm | 5.3 | 3.3 | 7.2 | 7.1 |

The above results show that even low density foams can be made successfully, using the new catalyst. This was heretofore not possible when methylene chloride was the blowing agent.

EXAMPLE 4

The method and materials of Example 1 were used to determine the effect of varying amounts of blocking of DMAPA with octanoic acids. In all runs, 0.3% of a 50% solution of DMAPA or DMAPA/acid combination in DPG was used, together with 0.7% of a 50% stannous octoate solution in DOP. The results are shown in Table IV which includes an experiment using DMAPA partially blocked by valproic acid (V.A.).

TABLE IV

| Acid | % | — | 2-EHA | 2-EHA | 2-EHA | V.A. |
|---|---|---|---|---|---|---|
| Blockage | % | 0 | 50 | 10 | 5 | 25 |
| Cream time | Sec | 10 | 16 | 16 | 14 | 17 |
| Rise time | Sec | 105 | 145 | 140 | 132 | 137 |
| Gel time | Sec | 145 | 188 | 184 | 172 | 177 |
| Health bubbles | | no | no | yes | yes | no | yes |
| Evaluation | | | split | good | good | split | good |
| Density | Pct | | — | 1.22 | 1.20 | — | 1.27 |
| Air flow | Scfm | | — | 4.1 | 7.9 | — | 4.1 |
| Comp. set 50% | % | | — | 5.7 | 4.6 | — | 5.6 |
| Comp. set 90% | % | | — | 6.9 | 5.0 | — | 13.0 |

Table IV shows that branched octanoic acids other than 2-ethylhexanoic acid can be used with equally good foams resulting therefrom. Also demonstrated is the fact that more than 5% of a branched octanoic acid is needed to produce an acceptable foam as 5% or less yields an unacceptable, split foam. Best results are seen using 20–30% equivalent of the above acid.

Since process times increase expectedly by blocking parts of the active catalyst, the use of more than 50% blocked DMAPA becomes uneconomical, although good foams may be obtained with 60–75% blocked DMAPA.

Since catalyst mixtures usually are provided in liquid form, it is particularly noteworthy that the new salts are also conveniently soluble in DPG, a solvent frequently ued for free amine catalysts for urethane reactions. DPG is a favored solvent because it is a reactive participant in the fashion of the polyol used. Excellent catalyst compounds are therefore those where DMAPA is blocked by 10–50 equivalent % with a branched octanoic acid and the mixture is dissolved in 50–200% DPG. A very practical and suitable solution contains one part of DMAPA/DMAPA-salt to one part of DPG, said salt representing 10–50% of the total catalyst content.

The preferred process of the invention is the preparation of a polyurethane foam from a polyisocyanate and a polyol in the presence of methylene chloride, DMAPA partially blocked by a branched octanoic acid and an amount of DPG equivalent to the weight of said partially blocked DMAPA. Other catalysts such as tin salts or other primary, secondary or tertiary amines may be added to said reaction and other blowing agents may be used in conjunction with said methylene chloride. These additional materials would preferably be selected by the processor to best suit his individual needs. Thus, the preferred catalyst solution according to this invention may include 0.1–0.4% of a tin salt.

The compounds of the present invention are usable with all types of polyols and polyisocyanates. A representative list of these can be found in U.S. Pat. No. 4,212,952, col. 2, line 60 to col. 3, line 9 and col. 2, lines 30–59, respectively.

What is claimed is:

1. The process of preparing a polyurethane foam from a polyisocyanate and a polyol using methylene chloride as a blowing agent, consisting essentially in carrying out the reaction in the presence of a catalytically effective amount of a partially blocked DMAPA, said partial blocking being caused by the inclusion of a branched octanoic acid present in the equivalent % of 10–50% of said DMAPA.

2. The process of claim 1 wherein said octanoic acid is 2-ethylhexanoic acid.

3. The process of claim 1 wherein said effective amount is 0.1 to 0.3% of said polyol.

4. The process of claim 1 wherein said partially blocked DMAPA is dissolved in DPG.

5. The process of claim 1 wherein said process is carried out in the presence of a catalytically sufficient amount of a divalent tin compound.

6. The process of claim 5 wherein said divalent tin compound is stannous octoate.

* * * * *